(12) United States Patent
Cho et al.

(10) Patent No.: US 9,793,020 B2
(45) Date of Patent: Oct. 17, 2017

(54) AUTOMATIC WELDING APPARATUS FOR END PLUG OF NUCLEAR FUEL ROD

(71) Applicant: KEPCO NUCLEAR FUEL CO., LTD., Daejeon (KR)

(72) Inventors: Young Choon Cho, Daejeon (KR); Chang Hwan Hwang, Daejeon (KR); Hung Soon Chang, Daejeon (KR); Sang Pil Kong, Daejeon (KR); Tae Hyung Na, Daejeon (KR); Young Seok Yoon, Daejeon (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 523 days.

(21) Appl. No.: 13/864,314

(22) Filed: Apr. 17, 2013

(65) Prior Publication Data

US 2014/0190943 A1 Jul. 10, 2014

(30) Foreign Application Priority Data

Jan. 8, 2013 (KR) .................. 10-2013-0002088

(51) Int. Cl.
*G21C 21/02* (2006.01)
*B23K 11/093* (2006.01)
*B23K 37/047* (2006.01)

(52) U.S. Cl.
CPC ............ *G21C 21/02* (2013.01); *B23K 11/093* (2013.01); *B23K 37/047* (2013.01)

(58) Field of Classification Search
CPC ............... B23K 11/093; B23K 37/047; B23K 11/0073; B23K 11/02; B23K 11/04; G21C 21/02; G21C 3/10; G21C 3/105; G21C 3/326; G21C 19/10; G21C 19/105; G21C 19/18; G21C 19/207
(Continued)

(56) References Cited

U.S. PATENT DOCUMENTS 3,702,914 A * 11/1972 Noura .............................. 219/73
3,725,635 A * 4/1973 Fink et al. ................ 219/121.46
(Continued)

FOREIGN PATENT DOCUMENTS

GB 2126511 A * 3/1984
JP 6-48310 B2 6/1994
(Continued)

*Primary Examiner* — Eric Stapleton
(74) *Attorney, Agent, or Firm* — Rabin & Berdo, P.C.

(57) ABSTRACT

Disclosed is an automatic welding apparatus for an end plug of a nuclear fuel rod, which is used to perform resistance welding on a cladding tube and the end plug in a welding chamber. The automatic welding apparatus includes a welding chamber configured to perform resistance welding on an end plug and a cladding tube, a cladding tube transfer unit that has a cladding tube clamp fixedly clamping the cladding tube and a first servo motor for driving the cladding tube clamp in a horizontal direction and that horizontally transfers the cladding tube to the welding chamber, end plug welding electrodes gripping the end plug fed from an end plug feeder, an end plug transfer driver for driving the end plug welding electrodes toward the welding chamber in a forward/backward direction, and a position control module for controlling driving of the first servo motor and the end plug transfer driver.

3 Claims, 5 Drawing Sheets

(58) Field of Classification Search
USPC ...... 219/56, 57, 101, 104, 117.1, 118, 78.01
See application file for complete search history.

(56) References Cited

U.S. PATENT DOCUMENTS

| | | | | |
|---|---|---|---|---|
| 3,925,636 | A | * | 12/1975 | Coleman .................. 219/104 |
| 4,012,619 | A | * | 3/1977 | Lifshits et al. ............. 219/101 |
| 4,097,712 | A | * | 6/1978 | Bezold ................ B23K 11/04 219/107 |
| 4,548,347 | A | * | 10/1985 | Christiansen ............ G21C 3/10 198/339.1 |
| 4,636,612 | A | * | 1/1987 | Cullen .................. 219/124.34 |
| 4,664,587 | A | * | 5/1987 | Case et al. ................. 414/680 |
| 4,704,512 | A | * | 11/1987 | Lisec ........................ 219/101 |
| 4,755,347 | A | * | 7/1988 | Tolmie ................... G21C 19/06 376/203 |
| 4,857,260 | A | * | 8/1989 | Schoenig, Jr. ....... B23K 37/047 29/723 |
| 4,892,993 | A | * | 1/1990 | Stol ....................... B23K 37/04 219/125.1 |
| 4,899,436 | A | * | 2/1990 | Jacquier ................ F22B 37/003 138/89 |
| 5,270,514 | A | * | 12/1993 | Wechselberger et al. .... 219/101 |
| 5,302,795 | A | * | 4/1994 | Kurokawa ........... B23K 11/312 219/59.1 |
| 5,375,756 | A | * | 12/1994 | Haughton et al. ............ 228/10 |
| 5,513,230 | A | * | 4/1996 | Crede ................ B23K 11/3009 219/103 |
| 5,699,393 | A | * | 12/1997 | Picard et al. ................ 376/261 |
| 5,923,555 | A | * | 7/1999 | Bailey et al. ................ 700/114 |
| 2008/0237308 | A1 | * | 10/2008 | Den Boer et al. ............ 228/164 |
| 2010/0108743 | A1 | * | 5/2010 | Kwon et al. ................. 228/102 |
| 2013/0126088 | A1 | * | 5/2013 | Wermelinger ................ 156/296 |
| 2013/0272484 | A1 | * | 10/2013 | Lee et al. ..................... 376/451 |
| 2014/0326411 | A1 | * | 11/2014 | Konita ................... B29C 65/02 156/379.6 |

FOREIGN PATENT DOCUMENTS

| | | |
|---|---|---|
| JP | 9-225637 A | 9/1997 |
| JP | 2000292588 A * | 10/2000 |
| KR | 10-2011-0054432 A | 5/2011 |
| KR | 10-1044336 B1 | 6/2011 |

* cited by examiner

AUTOMATIC WELDING APPARATUS FOR END PLUG OF NUCLEAR FUEL ROD

BACKGROUND OF THE INVENTION

1. Field of the Invention

The present invention relates to an automatic welding apparatus for an end plug of a nuclear fuel rod and, more particularly, to an apparatus for automatically welding a cladding tube and an end plug constituting a nuclear fuel rod in an accurate and rapid way using a servo motor.

2. Description of the Related Art

Nuclear reactors are facilities for artificially controlling a fission chain reaction of a fissionable material to use thermal energy generated from nuclear fission as power.

Nuclear fuel used in the nuclear reactor is manufactured by forming concentrated uranium into uniformly sized cylindrical pellets (hereinafter referred to as "sintered compacts") and then charging a plurality of sintered compacts in a fuel rod. This plurality of fuel rods constitutes a nuclear fuel assembly, wherein the fuel rods are loaded in a reactor core, and are then burnt by a nuclear reaction.

Referring to FIG. 1, the nuclear fuel rod 10 is made up of a cladding tube 11, end plugs 12, sintered compacts 13, and springs. After the sintered compacts 13 and springs are inserted into the cladding tube 11, the end plugs 12 are coupled to open ends, and are welded. After being welded, a weld upset protruding from a weld zone 10a of the cladding tube 11 and the end plug 12 is removed by a machining device.

A plurality of fuel rods manufactured in this way constitutes a nuclear fuel assembly, wherein the fuel rods are loaded in a reactor. Thus, to manufacture the nuclear fuel assembly, many fuel rods are required, and thus welding work of the cladding tube and the end plug is excessively required.

For example, the applicant of the present invention contrived a feeder apparatus for supplying an end plug of a nuclear fuel rod in which the end plug was designed to be automatically supplied to a welding position, and was granted Korean Patent No. 1044336 on Jun. 20, 2011. Further, in Korean Unexamined Patent Application Publication No. 10-2011-0054432 (published on May 25, 2011), a cutting and grinding apparatus for machining a weld zone of an end plug of a nuclear fuel rod by welding a cladding tube and an end plug and then machining a weld upset is disclosed.

Thus, in a process of manufacturing the nuclear fuel assembly requiring many nuclear fuel rods, performing welding work on the cladding tube and the end plug in an accurate and rapid way to improve efficiency and productivity of the work is a very important consideration in manufacturing the nuclear fuel assembly.

SUMMARY OF THE INVENTION

Accordingly, the present invention has been made keeping in mind the above problems occurring in the related art, and an object of the present invention is to provide an automatic welding apparatus for an end plug of a nuclear fuel rod, capable of automatically welding a cladding tube and an end plug constituting a nuclear fuel rod in an accurate and rapid way based on precise position control using a servo motor.

To achieve the aforementioned object, there is provided an automatic welding apparatus for an end plug of a nuclear fuel rod, which is used to perform resistance welding on a cladding tube and the end plug in a welding chamber. The automatic welding apparatus includes a welding chamber configured to perform resistance welding on an end plug and a cladding tube, a cladding tube transfer unit that has a cladding tube clamp fixedly clamping the cladding tube and a first servo motor for driving the cladding tube clamp in a horizontal direction and that horizontally transfers the cladding tube to the welding chamber, end plug welding electrodes gripping the end plug fed from an end plug feeder, an end plug transfer driver for driving the end plug welding electrodes toward the welding chamber in a forward/backward direction, and a position control module for controlling driving of the first servo motor and the end plug transfer driver.

Here, the end plug transfer driver may include a pressing cylinder for pressing and fixing the end plug to the cladding tube located in the welding chamber by driving the end plug welding electrodes in a forward/backward direction, and a second servo motor for driving the pressing cylinder in a forward/backward direction.

Further, the automatic welding apparatus may further include a cladding tube origin setting unit, which sets an origin of the cladding tube on a transfer section of the cladding tube transferred to the welding chamber, at a leading end of the welding chamber.

Also, the cladding tube origin setting unit may include a touch sensor that comes into contact with a leading end of the cladding tube to detect a position signal.

In addition, the position control module may control the first servo motor and the end plug transfer driver so that the end plug gripped by the end plug welding electrodes and the cladding tube clamped by the cladding tube clamp are introduced into the welding chamber at the same time.

In the automatic welding apparatus used to perform resistance welding on the cladding tube and the end plug in the welding chamber in accordance with the present invention, the cladding tube clamp transfers the cladding tube toward the welding chamber using the servo motor. The end plug welding electrodes transfer the end plug fed from an end plug automatic feeder toward the welding chamber using the servo motor and the pressing cylinder. The position control module accurately controls the driving of the servo motor to a welding position. The end plug and the cladding tube are welded rapidly, accurately, and with precise control, so that work efficiency and productivity can be improved.

BRIEF DESCRIPTION OF THE DRAWINGS

The above and other objectives, features and advantages of the present invention will be more clearly understood from the following detailed description when taken in conjunction with the accompanying drawings, in which.

DESCRIPTION OF THE PREFERRED EMBODIMENTS

Figure 1:
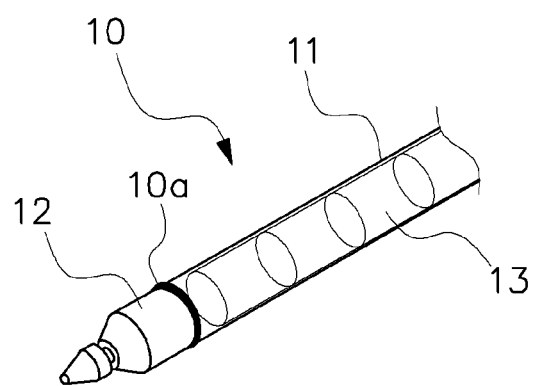
FIG. 1 shows a configuration of a typical nuclear fuel rod.

Reference will now be made in greater detail to an exemplary embodiment of the present invention with reference to the accompanying drawings.

An automatic welding apparatus for an end plug of a nuclear fuel rod according to an embodiment of the present invention includes: to perform resistance welding on a cladding tube and the end plug in a welding chamber, the welding chamber 110 configured to perform the resistance welding on the end plug 12 and the cladding tube 11; a cladding tube transfer unit 120 that has a cladding tube clamp 123 fixedly clamping the cladding tube 11 and a first servo motor 124 for driving the cladding tube clamp 123 in a horizontal direction and that horizontally transfers the cladding tube to the welding chamber 110; end plug welding electrodes 130 gripping the end plug 12 fed from an end plug feeder; an end plug transfer driver 140 for driving the end plug welding electrodes 130 toward the welding chamber 110 in a forward/backward direction; and a position control module 150 for controlling driving of the first servo motor 124 and the end plug transfer driver 140.

The welding chamber 110 is designed to position the end plug 12 and the cladding tube 11 in place and to perform resistance pressure welding (RPW). In the state in which leading ends of the end plug 12 and the cladding tube 11 positioned in the welding chamber 110 are pressurized, the PRW is performed along a weld zone of the end plug 12 and the cladding tube 11.

The cladding tube transfer unit 120 is for transferring the cladding tube toward the welding chamber 110, and includes the cladding tube clamp 123 installed on a first lead screw 125 which is extending on the same axis as a shaft axis of the first servo motor 124 and driven by the first servo motor 124, and fixedly clamping the cladding tube 11 that is horizontally guided by a plurality of rollers 122 disposed on roller supports 126 installed on a cladding tube transfer servo fixing plate 121 located in a horizontal direction, and the first servo motor 124 for driving the cladding tube clamp 123 in the horizontal direction by rotating the first lead screw 125.

Figure 5:
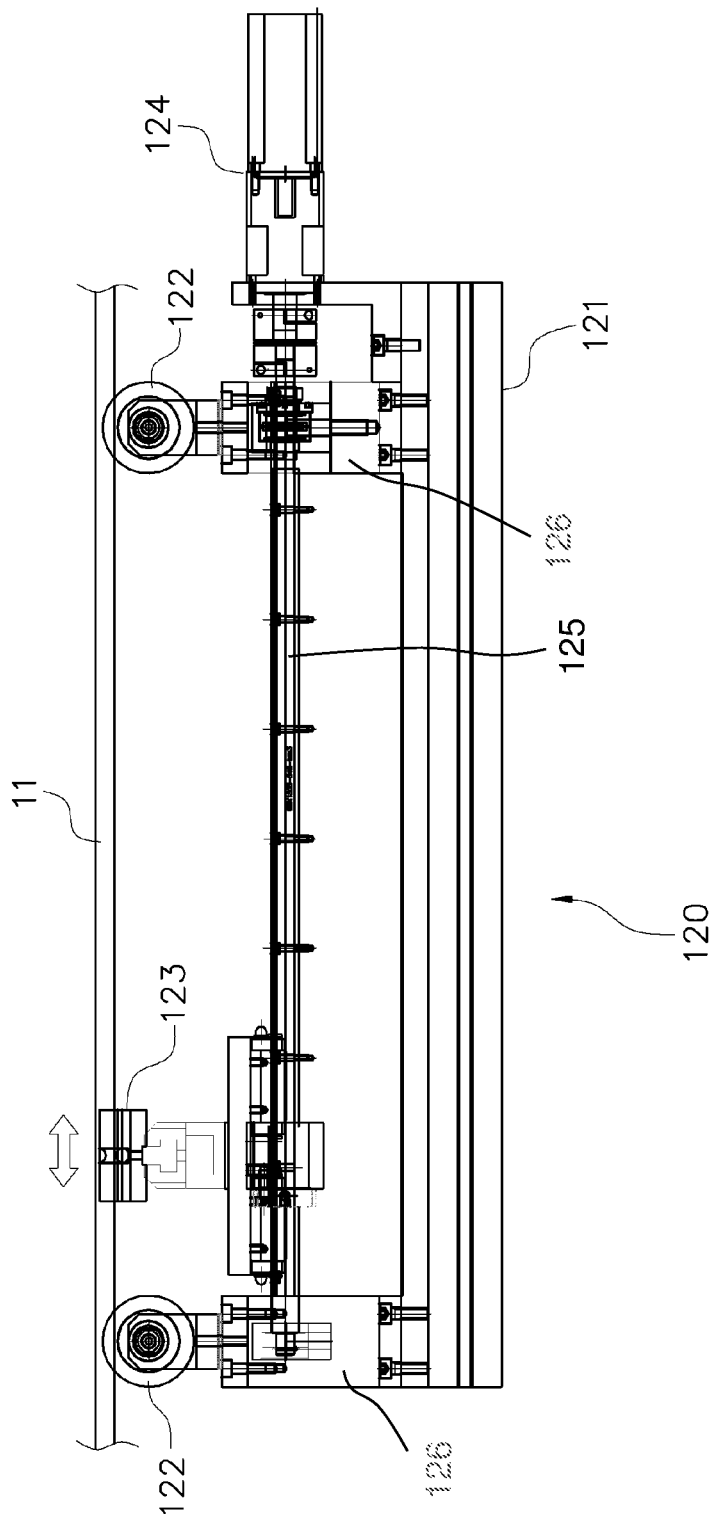
FIG. 5 showing a cladding tube transfer driver in the automatic welding apparatus according to the embodiment of the present invention.

Referring to FIG. 5, the cladding tube clamp 123 of the cladding tube transfer unit is driven in a forward/backward direction by the first servo motor 124. The cladding tube clamp 123 transfers the cladding tube 11 toward the welding chamber 110 with the cladding tube 11 clamped fixedly thereto. The first servo motor 124 is driven by a control system 150.

The first servo motor 124, which horizontally transfers the cladding tube 11, can be subjected to precise position control. As such, precise welding position control of the cladding tube is possible along with a touch sensor serving as a reference origin of the cladding tube to be described below.

Preferably, the present invention further includes a cladding tube origin setting unit 160 for detecting a position of a leading end of the cladding tube 11 transferred to the welding chamber 110. More preferably, the cladding tube origin setting unit 160 includes a touch sensor unit 161 that comes into contact with the leading end of the cladding tube 11 to detect a position signal.

Figure 2:
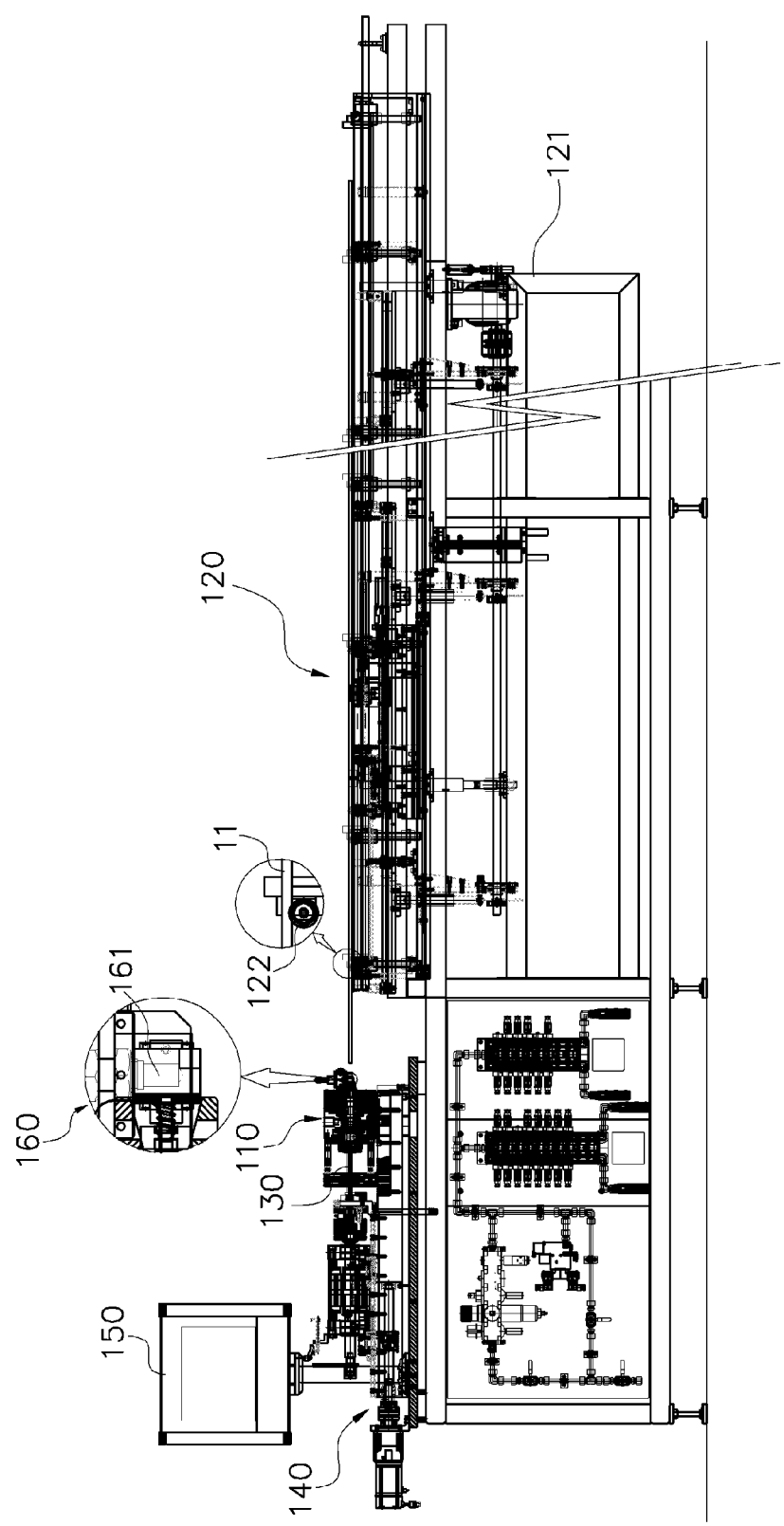
FIG. 2 is a front view of an automatic welding apparatus for an end plug of a nuclear fuel rod according to an embodiment of the present invention.
Figure 3:
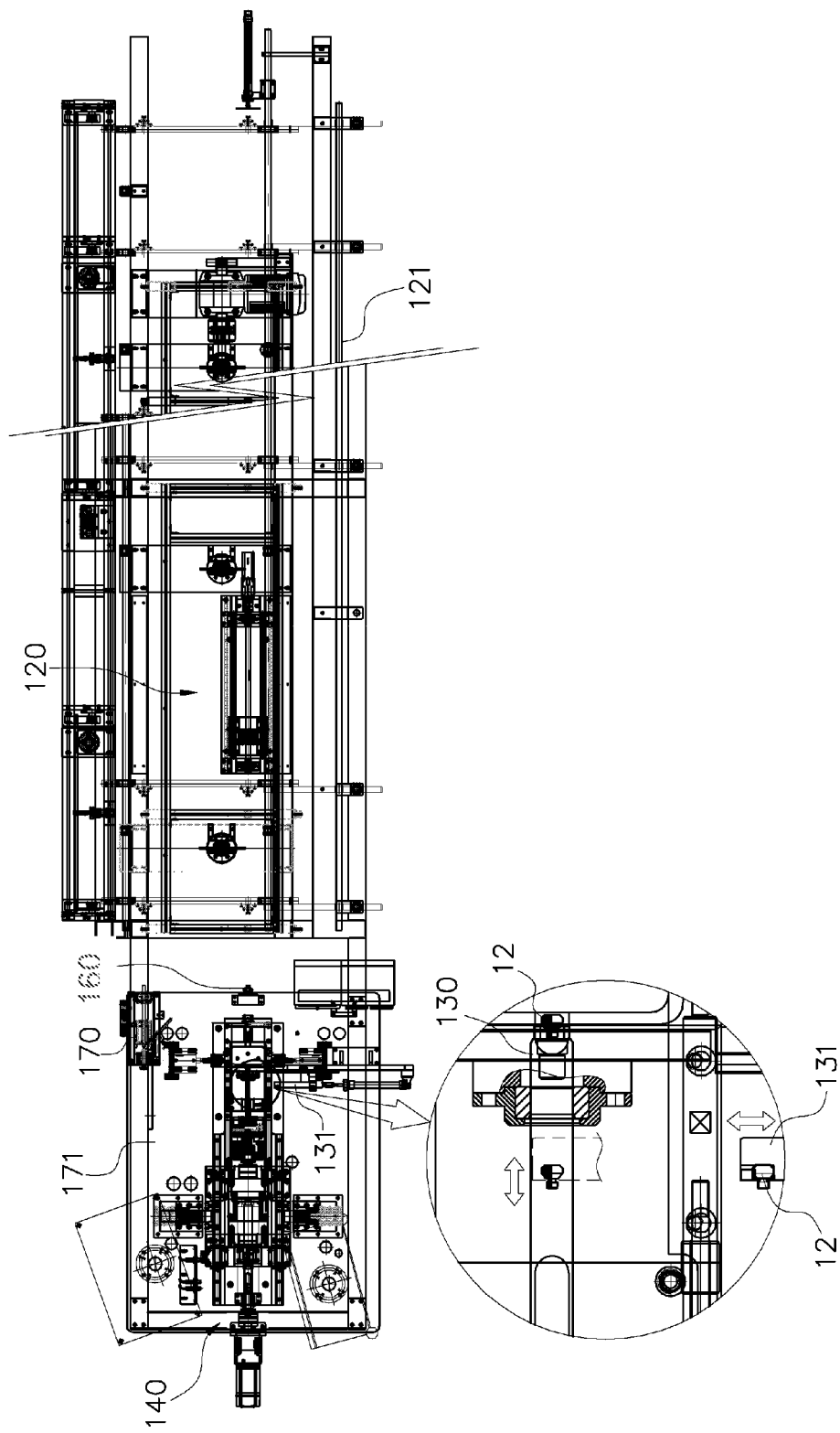
FIG. 3 is a front view of the automatic welding apparatus according to the embodiment of the present invention.

Referring to FIG. 2, the touch sensor unit 161 is mounted on a leading end of the welding chamber 110 to which the cladding tube is transferred. The touch sensor unit 161 can be displaced in a forward/backward direction by a linear motion (LM) guide, and comes into contact with the cladding tube 11 to recognize a position of the cladding tube 11. Preferably, the contact occurs twice to ensure accurate position recognition. The cladding tube transfer unit 120 moves forward to transfer the cladding tube 11 to the touch sensor unit 161 at a speed of 1000 rpm for the first contact, moves backward enough to be off the contact point and moves forward at a speed of 50 rpm for the second contact, and thus can precisely recognize the origin. This motion is for satisfying production speed and position accuracy requirements simultaneously.

Position data of the origin of the leading end of the cladding tube is sent to the control system 150. The cladding tube 11 is advanced and stopped until the leading end of the cladding tube reaches to the prescribed position based on the origin of the leading end of the cladding tube by the control system 150, and then is fixed by cladding tube electrodes 111.

The end plug welding electrodes 130 grip the end plug 12 fed from the end plug feeder and transfer the end plug 12 up to the welding chamber 110. To fix the end plug 12, the end plug welding electrode 130 is provided with a vacuum nozzle at a lead end thereof, and thus the end plug 12 can be sucked and fixed under the vacuum.

The end plug feeder discharges the end plugs from an end plug magazine one by one so as to be able to automate a continuous process. The discharged end plugs are transferred to the end plug welding electrodes 130 one by one by the end plug clamp 131.

The end plug clamp 131 moves forward up to the end plug welding electrodes 130 with the end plug 12 clamped by driving a cylinder. Next, the end plug 12 clamped by the end plug clamp 131 is released to the end plug welding electrodes 130 that are on standby perpendicular to the end plug clamp 131. Here, the end plug welding electrodes 130 fix the end plug 12 under the vacuum.

The end plug welding electrodes 130 gripping the end plug 12 in this way are transferred to the welding chamber 110 by forward driving of the end plug transfer driver 140.

The end plug 12 transferred to the welding chamber 110 should be rapidly fed and be capable of withstanding a predetermined pressing force in order to guarantee precise welding. Thus, in the present invention, a pressing cylinder and a servo motor are used as a driving source for putting the pressure on the end plug and transferring the end plug 12 to the welding chamber 110 respectively.

Figure 4:
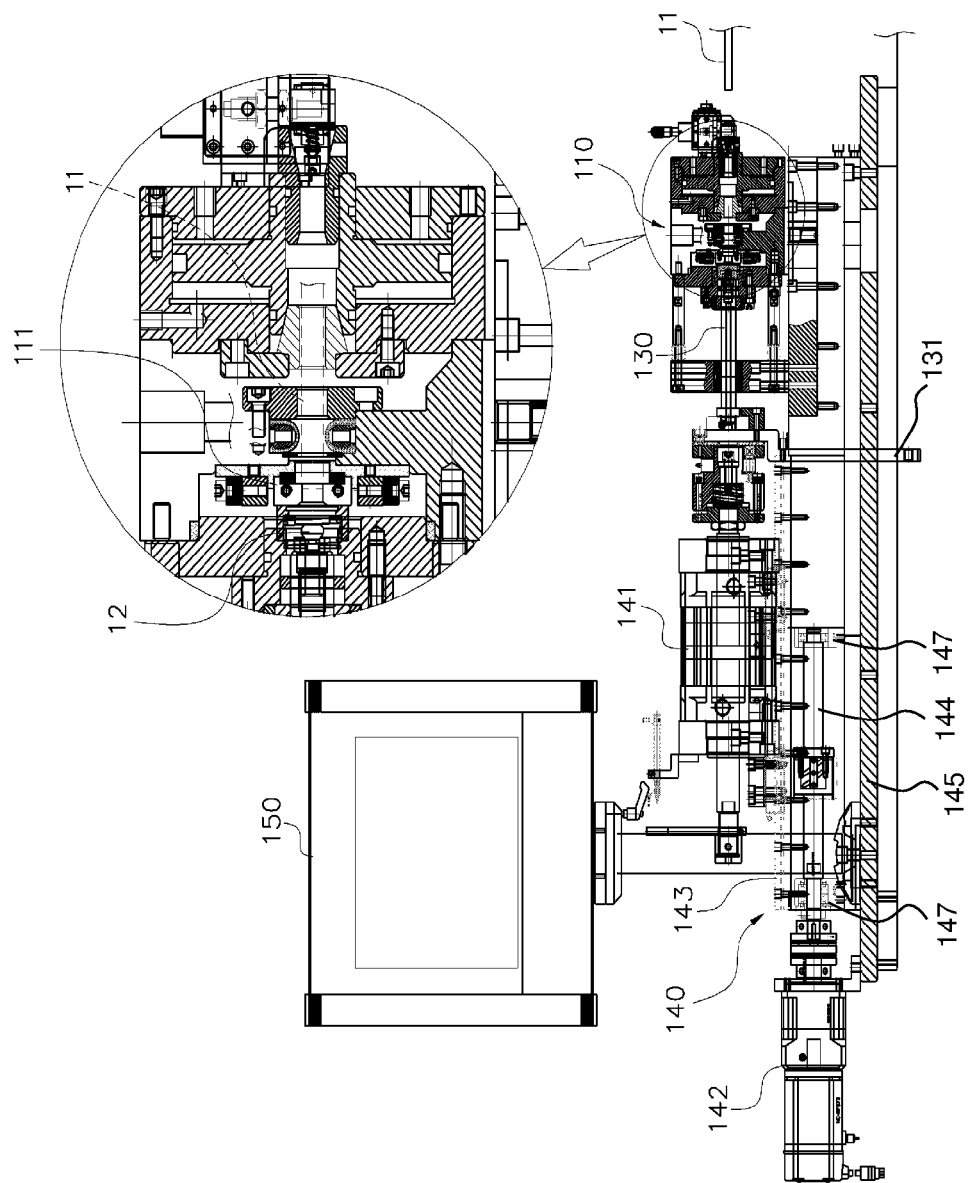
FIG. 4 showing a welding chamber and an end plug transfer driver in the automatic welding apparatus according to the embodiment of the present invention.

In detail, referring to FIG. 4, the present invention is characterized in that the end plug transfer driver 140 is made up of a pressing cylinder 141 for pressing and fixing the end plug 12 to the cladding tube 11 located in the welding chamber 110 by driving the end plug welding electrodes 130 in a forward/backward direction, and a second servo motor 142 for driving the pressing cylinder 141 in a forward/backward direction.

The pressing cylinder 141 is fixed to a transfer plate 143 that can move backward and forward. The transfer plate 143 is installed on a second lead screw 144 and driven in a forward/backward direction by the second servo motor 142. The second lead screw 144 is extending on the same axis as a shaft axis of the second servo motor 142 and driven by the second servo motor 142. Both ends of the second lead screw 144 are supported by second lead screw supports 147 which are fixedly installed on the end plug transfer driver fixing plate 145. The end plug transfer driver fixing plate 145 supports the pressing cylinder 141, the second servo motor 142, the transfer plate 143 and the second lead screw 144.

The second servo motor 142 of the end plug transfer driver 140 is driven, and thus the end plug 12 is delivered from the end plug clamp 131 clamping the end plug 12 by vacuum suction of the leading ends of the end plug welding electrodes 130, and then the end plug clamp 131 moves backward up to a standby position. When the end plug clamp 131 moves backward, the end plug welding electrodes 130 are subjected to primary forward movement by the second servo motor 142. When the primary forward movement is completed, the pressing cylinder 141 is driven, the end plug welding electrodes 130 are subjected to secondary forward movement toward the cladding tube welding electrodes to which the cladding tube is fixed in the welding chamber 110. Thereby, when the leading ends of the end plug 12 and the cladding tube 11 are pressed and come into contact with each other, welding current flows to weld the end plug 12 and the cladding tube 11.

In the present invention, the driving of each component is controlled by the control system 150. Particularly, the control system 150 includes a position control module in order to control the pressing cylinder 141 and the second servo motor 142 which transfer the end plug, along with the first servo motor 124. Further, the position control module uses a signal transmitted from a cladding tube position detector 160 as input information in order to obtain information about an accurate position of the cladding tube.

Preferably, the control system of the present invention controls the processes of transferring the end plug 12 and the cladding tube 11 to the welding chamber 110 at the same time. Thus, a transferring speed can be reduced, and a process can be simplified. Further, a rate of production can be increased.

After the end plug 12 and the cladding tube 11 are welded, the fuel rod is discharged by the cladding tube clamp 123. This process is repeated, the next welding of the end plug and the cladding tube is performed.

A main base 171 at which the welding chamber 110 is located may be provided with a weld upset check unit 170 for checking a weld upset 10a.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. An automatic welding apparatus for an end plug of a nuclear fuel rod, comprising:
   a welding chamber for welding the end plug and a cladding tube by a resistance welding;
   a cladding tube transfer unit adjoining a first side of the welding chamber and horizontally transferring the cladding tube to the welding chamber, the cladding tube transfer unit including
      a cladding tube transfer servo fixing plate supporting the cladding tube transfer unit,
      a first roller support fixedly installed on the cladding tube transfer servo fixing plate,
      a second roller support fixedly installed on the cladding tube transfer servo fixing plate and separated from the first roller support at intervals,
      a first roller disposed on the first roller support,
      a second roller disposed on the second roller support, wherein when the cladding tube is horizontally transferred to the welding chamber on the second roller and the first roller, each of the second roller and the first roller rotates in a longitudinal direction of the cladding tube,
      a first lead screw of which one end is supported by the first roller support and the other end is supported by the second roller support,
      a first servo motor driving the first lead screw from a lateral side of the cladding tube transfer servo fixing plate, a shaft axis of the first servo motor being on an imaginary extension line of an axis of the first lead screw,
      a cladding tube clamp moving between the first roller support and the second roller support on the first lead screw in a horizontal direction by a rotation of the first servo motor, the cladding tube clamp fixedly clamping the cladding tube and transferring the cladding tube to the welding chamber, and
      a cladding tube electrode disposed inside the welding chamber and configured to fix a leading end of the cladding tube;
   an end plug welding electrode through which welding current flows, the end plug welding electrode being provided with a vacuum nozzle at a leading end thereof to grip the end plug by a vacuum manner and transferring the end plug from an outside of the welding chamber to the inside of the welding chamber;
   an end plug clamp disposed in the second side of the welding chamber and transferring the end plug from an end plug feeder to the end plug welding electrode, the second side of the welding chamber being opposite side of the first side of the welding chamber;
   an end plug transfer driver adjoining the second side of the welding chamber and driving the end plug welding electrode toward the welding chamber in a forward/backward direction, the end plug transfer driver including
      an end plug transfer driver fixing plate supporting the end plug transfer driver,
      a second servo motor fixedly installed on the end plug transfer driver fixing plate,
      second lead screw supports fixedly installed on the end plug transfer driver fixing plate,
      a second lead screw of which both ends are supported by the second lead screw supports, wherein the second lead screw is driven by the second servo motor and an axis of the second lead screw is on an imaginary extension line of a shaft axis of the second servo motor,
      a transfer plate moving on the second lead screw in a forward/backward direction by a rotation of the second servo motor, and
      a pressing cylinder disposed outside the welding chamber and fixed on the transfer plate, the pressing cylinder driving the end plug welding electrode for pressing and fixing the end plug to the cladding tube located in the welding chamber.

2. The automatic welding apparatus set forth in claim 1, further comprising a cladding tube origin setting unit, which sets an origin of the cladding tube on a transfer section of the cladding tube transferred to the welding chamber, at a leading end of the welding chamber.

3. The automatic welding apparatus set forth in claim 2, wherein the cladding tube origin setting unit includes a touch sensor that comes into contact with the leading end of the cladding tube to detect a position signal.

* * * * *